United States Patent
De Lesseux et al.

(10) Patent No.: US 9,980,609 B2
(45) Date of Patent: *May 29, 2018

(54) INSULATED SHIPPING BAGS

(71) Applicant: COLDKEEPERS, LLC, Thomasville, GA (US)

(72) Inventors: Lionel de Bazelaire De Lesseux, Thomasville, GA (US); Robert Gary Stampfli, Tallahassee, FL (US); Langdon Strong Flowers, III, Thomasville, GA (US)

(73) Assignee: COLDKEEPERS, LLC, Thomasville, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/077,204

(22) Filed: Mar. 22, 2016

(65) Prior Publication Data

US 2016/0198901 A1    Jul. 14, 2016

Related U.S. Application Data

(62) Division of application No. 11/838,559, filed on Aug. 14, 2007, now Pat. No. 9,290,313.

(60) Provisional application No. 60/907,932, filed on Apr. 23, 2007.

(51) Int. Cl.
    *A47J 41/00* (2006.01)
    *B65D 81/38* (2006.01)

(52) U.S. Cl.
    CPC ....... *A47J 41/0066* (2013.01); *A47J 41/0072* (2013.01); *B65D 81/389* (2013.01); *B65D 81/3893* (2013.01); *B65D 81/3897* (2013.01)

(58) Field of Classification Search
    CPC ....... A45C 11/20; A45C 7/0077; A45C 13/02; B65D 81/389; B65D 81/3893; B65D 81/3897; F25D 3/08; A47J 41/0066; A47J 41/0072
    USPC .......................................... 383/103, 107–110
    See application file for complete search history.

(56) References Cited

U.S. PATENT DOCUMENTS

| | | | | | |
|---|---|---|---|---|---|
| 1,939,777 | A | * | 12/1933 | Humboldt | B65D 81/3886 126/261 |
| 2,289,254 | A | * | 7/1942 | Eagles | A45C 11/20 220/592.01 |
| 2,625,695 | A | * | 1/1953 | Nicholson | A47G 9/086 2/84 |
| 2,667,198 | A | * | 1/1954 | Klein | A45C 11/20 383/107 |
| 2,795,258 | A | * | 6/1957 | Berry | A45C 11/20 190/106 |
| RE24,600 | E | * | 2/1959 | Ziff | A45C 11/20 150/119 |
| 2,954,891 | A | * | 10/1960 | Imber | B65D 81/3834 220/592.2 |
| 3,074,250 | A | * | 1/1963 | Everett | A61F 7/10 224/624 |

(Continued)

*Primary Examiner* — Peter Helvey
(74) *Attorney, Agent, or Firm* — Withers & Keys, LLC

(57) ABSTRACT

A collapsible insulated bag designed to allow items retained within an inner pouch thereof to remain within predetermined temperature ranges for predetermined periods of time and wherein the bags are designed to be easily compressed or compacted for storage or shipment to end users. The bags include at least an outer reflective layer, an intermediate open foam layer and the inner pouch layer.

20 Claims, 8 Drawing Sheets

(56) References Cited

U.S. PATENT DOCUMENTS

| | | | | |
|---|---|---|---|---|
| 3,083,890 A | * | 4/1963 | Ignell | B65D 5/064 229/123.1 |
| 3,272,373 A | * | 9/1966 | Alleaume | B63B 25/12 114/74 A |
| 3,763,972 A | * | 10/1973 | Karzmar | A45C 9/00 190/8 |
| 3,980,225 A | * | 9/1976 | Kan | B31B 37/00 383/104 |
| 4,185,673 A | * | 1/1980 | Daniello | A45C 9/00 190/8 |
| 4,211,091 A | * | 7/1980 | Campbell | B65D 81/3897 383/110 |
| 4,211,267 A | * | 7/1980 | Skovgaard | B65D 81/03 229/69 |
| 4,343,158 A | * | 8/1982 | Campbell | A61J 1/165 383/110 |
| 4,468,933 A | * | 9/1984 | Christopher | A45C 11/20 383/110 |
| 4,509,645 A | * | 4/1985 | Hotta | A45C 11/20 206/545 |
| 4,528,694 A | * | 7/1985 | Skovgaard | B65D 33/243 383/10 |
| 4,537,313 A | * | 8/1985 | Workman | A45C 11/20 206/545 |
| 4,578,814 A | * | 3/1986 | Skamser | A47J 47/145 206/545 |
| 4,595,101 A | * | 6/1986 | Rivera | B65D 81/3897 126/339 |
| 4,620,633 A | * | 11/1986 | Lookholder | B65D 81/03 206/523 |
| 4,679,242 A | * | 7/1987 | Brockhaus | A45C 3/04 190/1 |
| 4,842,330 A | * | 6/1989 | Jay | A61G 5/1043 297/4 |
| 4,854,736 A | * | 8/1989 | McVeigh | A45C 3/04 383/110 |
| 4,892,226 A | * | 1/1990 | Abtahi | A45C 11/008 206/204 |
| 4,988,216 A | * | 1/1991 | Lyman | A45C 11/20 383/110 |
| 5,286,089 A | * | 2/1994 | Goldman | A47C 7/022 297/452.23 |
| 5,472,279 A | * | 12/1995 | Lin | A45C 11/20 383/110 |
| 5,490,396 A | * | 2/1996 | Morris | B65D 81/18 383/110 |
| 5,904,230 A | * | 5/1999 | Peterson | A45C 11/20 190/107 |
| 6,056,439 A | * | 5/2000 | Graham | B65D 77/225 220/89.1 |
| 6,068,402 A | * | 5/2000 | Freese | B65D 81/3897 383/108 |
| 6,175,980 B1 | * | 1/2001 | Gaither | A47C 7/021 297/228.12 |
| 6,210,037 B1 | * | 4/2001 | Brandon, Jr. | A45C 13/02 220/495.08 |
| 6,247,328 B1 | * | 6/2001 | Mogil | A45C 7/0077 383/110 |
| 6,513,974 B2 | * | 2/2003 | Malone | B65D 81/052 206/522 |
| 6,932,509 B2 | * | 8/2005 | Shah | B65D 77/225 383/103 |
| 7,364,360 B2 | * | 4/2008 | Urman | B65D 21/0219 383/103 |
| 2001/0036520 A1 | * | 11/2001 | Hall | B32B 5/18 428/35.5 |
| 2003/0179960 A1 | * | 9/2003 | Beaulieu | B65D 31/08 383/53 |
| 2004/0040787 A1 | * | 3/2004 | Eastman, II | A01M 31/02 182/187 |
| 2004/0136621 A1 | * | 7/2004 | Mogil | A45C 7/0077 383/110 |
| 2004/0195891 A1 | * | 10/2004 | Vaughan | A47C 1/146 297/377 |
| 2004/0252919 A1 | * | 12/2004 | Welch | B65D 81/3886 383/110 |
| 2005/0117817 A1 | * | 6/2005 | Mogil | A45C 7/0077 383/110 |
| 2005/0281494 A1 | * | 12/2005 | Allen | B65D 33/01 383/109 |
| 2006/0126972 A1 | * | 6/2006 | Tighe | B65D 31/04 383/109 |
| 2006/0198562 A1 | * | 9/2006 | Mogil | A45C 7/0077 383/121.1 |
| 2007/0274613 A1 | * | 11/2007 | Pruchnicki | A45C 7/0077 383/110 |
| 2009/0266910 A1 | * | 10/2009 | Hunter | A61L 9/12 239/57 |

* cited by examiner

INSULATED SHIPPING BAGS

CROSS REFERENCE TO RELATED APPLICATIONS

This patent application is a divisional patent application of U.S. Utility patent application Ser. No. 11/838,559 entitled "INSULATED SHIPPING BAGS" filed on Aug. 14, 2007, now U.S. Pat. No. 9,290,313, which claims the benefit of priority to U.S. Provisional Application for Patent Ser. No. 60/907,932, filed Apr. 23, 2007 and entitled "INSULATED SHIPPING BAGS", the entire contents of both of which are incorporated herein by reference.

BACKGROUND OF THE INVENTION

Field of the Invention

This invention is directed to the field of thermal containers primarily used in the shipping or storage of goods, foodstuffs, samples and the like items that must be maintained within predetermined temperature ranges for predetermined periods of time in order to ensure the safety and quality of such items. More particularly, the invention is directed to collapsible insulated bags that are designed to allow items held therein to be maintain within predetermined temperatures, either hot or cold, for extended periods of time. The collapsible bags are ideal for long distance shipment of perishable items such as foods, samples and medical items, and may also be used for catering, take-out as well as for traditional cooler functions.

Brief Description of the Prior Art

There are numerous industries wherein the safe transportation or shipment and storage of temperature sensitive products or samples is critical to the preservation of the products or samples. Medical supplies, samples, transplants and the like must often be maintained within controlled temperatures during periods of shipment from suppliers to users, providers to patients, and between operating facilities. With the popularity of online grocery shopping growing, there is also a need to improve upon insulated packaging for transporting goods such as frozen foods from temperature controlled environments to the end-consumers. Frequently, delivered packages may have to be left for extended periods in less than optimal ambient conditions before a consumer actually takes possession of the goods being shipped.

Currently, to maintain shipped items at optimal temperatures, options have been tried which include foam coolers, dry ice packs or boxes and insulated storage bags. Each of these options comes with drawbacks, including limited lengths of time for maintaining goods or items at optimal temperatures, environmental impact or safety concerns and increased shipping cost to cover container weight and/or size or express deliveries.

Foam coolers combined with dry ice packs can, in some instances, effectively maintain items at optimal temperatures, However, their use is costly in both supply costs and excess shipping costs. In addition, foam coolers have a negative impact on the environment and the handling of dry ice packs can raise safety concerns.

Dry ice packs have been used alone to ship and deliver perishable items. However, their ability to maintain optimal temperatures for extended periods of time while in a standard cardboard container is extremely poor.

Other bags have been used for short term transportation of perishable items. However, their use is limited to only conveyance of the item and not for maintaining the item in an optimal temperature range for any significant period of time, such as more than one to three hours or more.

In view of the foregoing, there is a need to provide insulated shipping containers that can provide greater insulating properties to ensure that goods, foodstuffs, medical supplies and samples and other items that are temperature sensitive may be safely shipped and maintained within necessary temperatures for greater periods of time than is possible using conventional shipping containers.

There is a further need to provide insulated shipping and transportation containers that can also be compactly configured to reduce shipping and transportation costs without reducing the insulating properties thereof.

SUMMARY OF THE INVENTION

The present invention includes flexible or collapsible hot/cold storage or shipping bags that are preferably self configuring and/or supporting but easily manipulated to a reduced size to be placed in an outer container or box for shipment. In the preferred embodiments, the bags are formed of at least three layers of insulating materials including an outer metallic or radiate energy reflecting layer, an intermediate open cell foam insulating layer and an inner low thermal convection and food grade plastic layer.

In some embodiments, the fully flexible insulated bags are designed to be used as stand-alone containers capable of maintaining a supporting shape when placed on a support surface. However, the bags may also be placed into, or folded and subsequently placed into, an outer protective structure such as a cardboard container or box, a plastic bag or bin or any other shipping container. Due to the flexible insulating materials of the bags, they may be shaped to conform to, or reduce the spaced occupied within, outer containers, thereby maximizing shipping efficiencies and reducing shipping costs.

In a preferred embodiment of the invention, the inner plastic layer is formed as a bag with an outwardly folded cuff at an opening therein such that the cuff frictionally receives and retains upper free end portions of opposing side walls of the intermediate insulation material therein. In this manner, the intermediate insulation material is mechanically secured to the inner plastic layer such that both layers may be simultaneously inserted within the outer reflective or metallic foil layer. This frictional retention of the intermediate layer within the cuff of the inner plastic layer will also function to retain the intermediate insulating layer in place within the outer layer when the composite insulating bags of the invention are in use. In some embodiments, the upper end of the inner plastic bag layer is welded to the inner surface of the outer layer, at or spaced slightly below the upper edges of the outer layer. The outer reflective or foil layer, is also formed into a bag-like configuration by folding a length of foil on itself, from end-to-end, and thereafter welding the opposite side edges together.

The composite or multi-layer insulated bags of the invention may also include different closure and handle structures. In some embodiments, the inner plastic bag-like structures may be heat sealed at their upper open ends after articles or items are placed with the insulated bags. In other embodiments, mechanical zip-like closures or double sided tapes may be used to seal the upper open ends of the inner plastic bags after articles or items are placed therein. In yet other embodiments, the inner plastic bags may not be sealed. Preferably, the upper ends of the outer reflective or foil bag-like layers are provided with either heat seals or mechanical zip-like or friction lock seals. In some embodiments, the seals may be created using friction lock engaging handle members that are initially sealed to the upper edges of the opposing sides of the outer reflective or foil layer and which include components that interlock with one another as the handle members are locked together.

In some embodiments of the invention, to facilitate the compact handling and/or folding of the multi-layered insulated shipping and storage bags of the invention for shipment to wholesalers or end users for subsequent use, the interior of the bags, and especially the intermediate open cell foam layers are designed to be evacuated by the application of a partial vacuum. Such a vacuum may be applied to the bags through an opening between the outer reflective layer and the intermediate open cell foam material thereof by use of a vacuum tube or by placing the bags within an enclosure under a reduced atmosphere or by physical compression of the bags. When the vacuum tube is withdrawn or the predetermined reduced pressure is obtained within the bags, the outer openings therein are closed by removable adhesive patches or covers to prevent ambient air from entering the bags. When the bags have been at least partially evacuated so that air is removed from the open cell foam and from between the outer reflective layer and the foam, they are easily folded into compact configurations for storage or for shipment. When the bags are to be used by an end user, the patches or covers are removed and the bags will automatically expand as ambient air enters the vacuum openings therein. After the bags are inflated, the adhesive patches or covers may be reapplied to prevent contaminants from entering the openings therein. In this regard, when the insulated shipping and storage bags are to be used to ship or store items that must remain sterile, the vacuum processes and inflating processes may take place within sterile enclosures.

The compact handling of the multi-layered insulated shipping and storage bags of the invention for storage or shipment to wholesalers or end users for subsequent use may also be accomplished by placing one or more insulate bags within an outer plastic bag have one end with a sealable opening. Thereafter, the outer bag is mechanically collapsed to force most air out of the enclosed insulated shipping bags and the outer bag and the outer bag subsequently sealed. In some embodiments, a partial vacuum may be applied within the outer bag to reduce the pressure therein and to reduce the volume of the overall package.

Further, in the embodiments wherein the intermediate foam layers are seated or sealed with their upper edge portions within the cuffs of the inner plastic layers and the cuffs sealed to the outer reflective layer or wherein the upper edges of the inner plastic layer are sealed to the outer reflective layer to isolate the foam layer there between from the ambient environment, any reduction in pressure within the space between the foam layers and the outer reflective layer will not affect the sterility of the inner surface of the inner plastic layer.

In addition to the use of the collapsible hot/cold thermal insulated shipping and storage bags for foodstuffs, such as frozen foods or hot prepared food dishes, the bags are also ideal for other uses including transporting of medical items including medicine, blood, samples and organs, and other products that must be retained within tightly controlled temperatures.

The collapsible hot/cold thermal insulated shipping and storage bags are capable of maintaining perishable items at their optimal temperatures for extended periods of time. By way of example, the process of keeping items cold while moving them from one area to another is known as cold chain. A cold chain is further defined as an uninterrupted series of storage and distribution activities that are used to maintain the temperature of an item in a given range. The collapsible hot/cold insulated shipping and storage bags of the invention allow items to be left with the end-consumers where the items can be safely maintained at their optimal temperatures, either hot or cold, for three or more hours.

In addition, the insulated shipping and storage bags of the invention are designed to be both light-weight and flexible thereby allowing the bags to be compressed, folded and compactly placed in shipping containers without consuming space that may be used for shipping other items and thereby aiding in reduction of both shipping and storage costs.

A further advantage of the insulated shipping and storage bags of the invention is that the open celled foam intermediate layer also function to cushion the contents of the bags, especially during transit and thus damage to the contents of the bags is less likely than with other prior art shipping containers.

BRIEF DESCRIPTION OF THE DRAWINGS

A better understanding of the invention will be had with reference to the accompanying drawings wherein.

DESCRIPTION OF THE PREFERRED EMBODIMENTS

Figure 1:
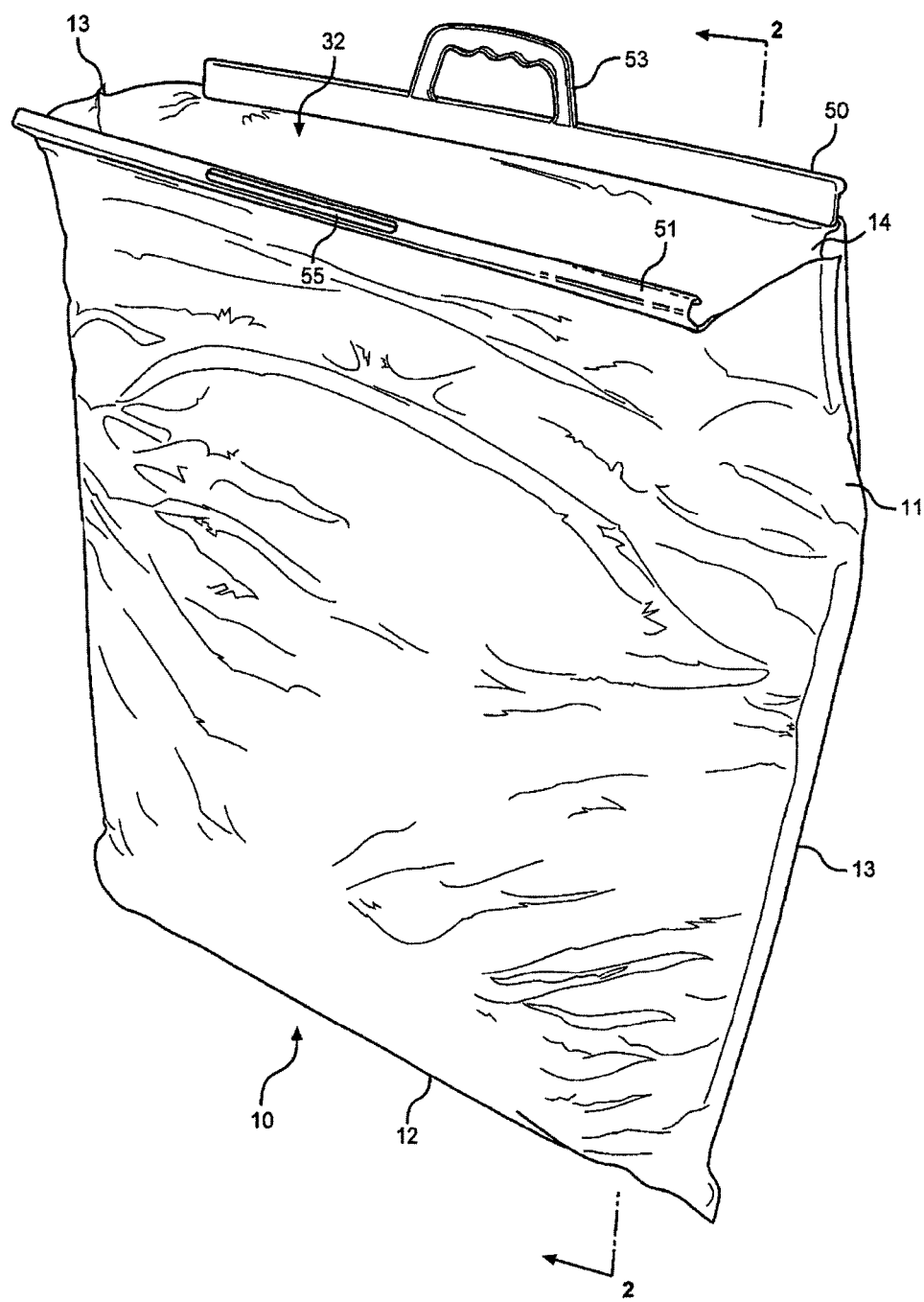
FIG. 1 is a top front perspective view of one embodiment of the present invention shown in an open position to receive an article or item therein.

With continued reference to the drawings, the invention will be described with respect to several embodiments for insulated and flexible or pliable hot/cold storage and shipping bags. A first embodiment of insulated bag 10 in accordance with the invention is shown in FIGS. 1-4. The insulated bag 10 is a multi-layer structure for storing and shipping temperature sensitive items that is made of at least three layers of thermal insulating materials. An outer layer 11 is made of materials known for reflecting radiant heat, are tear resistant, non-porous, leak proof, that can be heat sealed or otherwise welded or sealed with a sterile poly pouch material and that is compatible with conventional printing techniques. Such materials include, but are not limited to, thermoplastic polymers, such as metallic polyethylene terephthalate (METPET), and various metallic foils. As noted, the outer layer 11 can be printed with advertising information or any other indicia as desired.

The outer layer is formed of the above identified materials and is generally rectangular in shape when laid out in a one piece film. The outer layer is preformed into a pouch or bag shape by folding the one piece film along a midline thereof to create a bottom portion 12 with the side edges thereof being welded, heat sealed or otherwise sealed to form opposite side seams 13 thereby creating an opening 14 into the outer layer.

Figure 2:
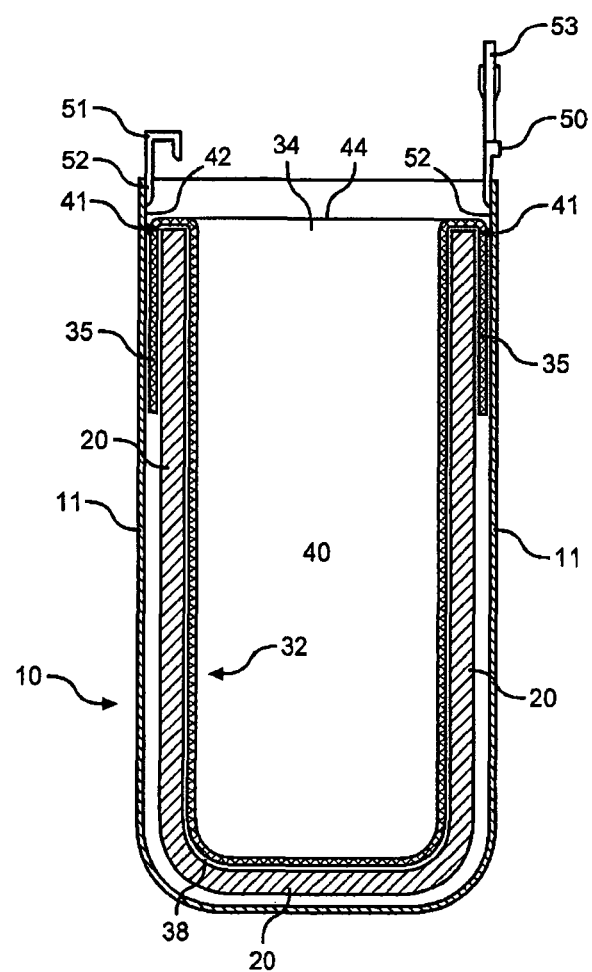
FIG. 2 is a cross section taken along line 2-2 of FIG. 1 showing the insulation layers of the thermal insulated shipping and storage bag.

An intermediate insulating layer 20, see FIG. 2, is constructed of materials known for having low thermal transfers. Such materials include but are not limited to low density collapsible open cell polyurethane foams, including those foams that exhibit memory to reshape themselves after being deformed. Thus, the insulating layer is made of a collapsible or compressible, memory foam with thermal and cushioning properties. The foam can be die-cast (molded) or cut and shaped to prevent any thermal bridges.

Thermal bridges are created when poorly insulated materials are used and allow heat transfer to occur through the material. To prevent thermal bridges, the insulated foam materials must be properly designed and placed to properly insulate the area of concern in which an item to be contained within the insulated bag is to be received. In view of this, the insulating foam layer 20 is made from a polyurethane or polyurethane-like foam to prevent thermal bridges and to effectively maintain the low thermal transfer needed to assure that any perishable product is maintained at optimal temperatures. In addition to the low thermal properties of the foam, the foam is able to conform to any item enclosed and to thereby become the frame and/or structure of the item. The self-forming foam creates a base or floor, lid and walls for a product when the product is placed therein. The foam also provides a protective cushion for any articles placed within the bags and thus protects against article damage.

Figure 3:
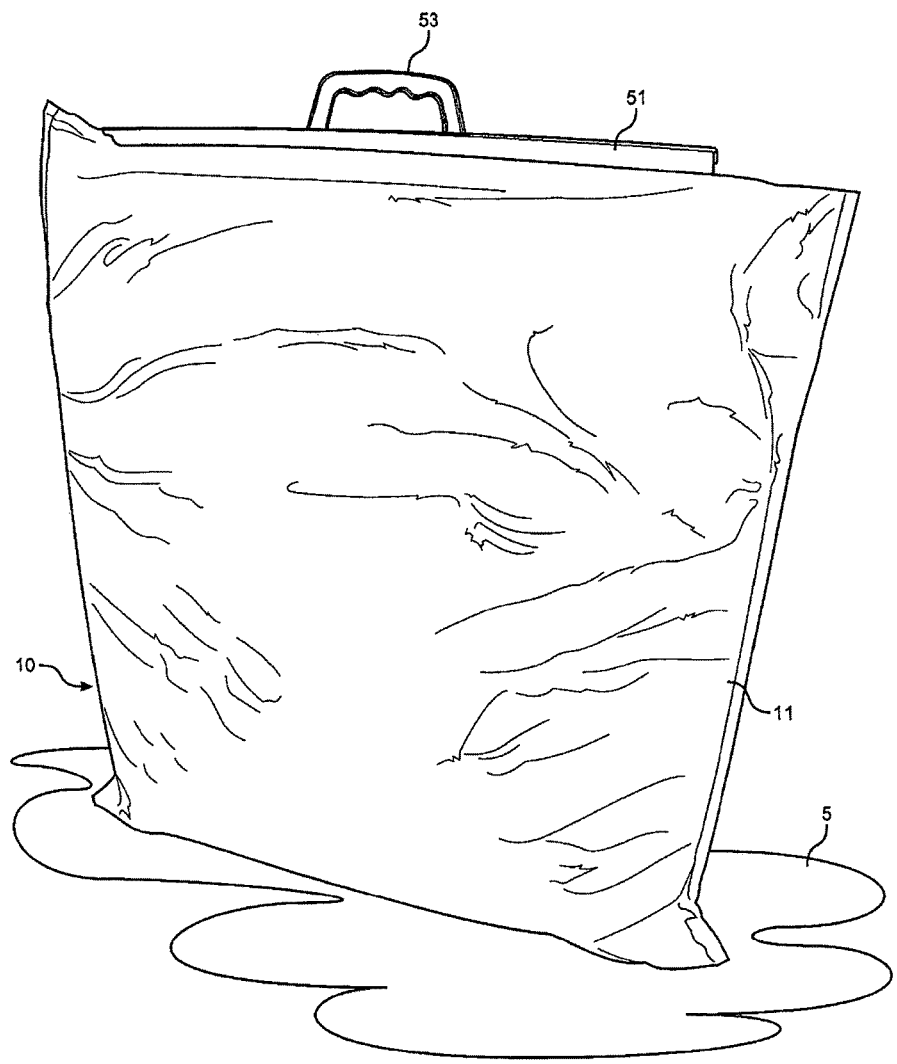
FIG. 3 is a top front perspective view of the embodiment of the invention shown in FIG. 1 with an article placed therein and showing how the insulated shipping and storage bag is self-standing on a support surface.
Figure 4:
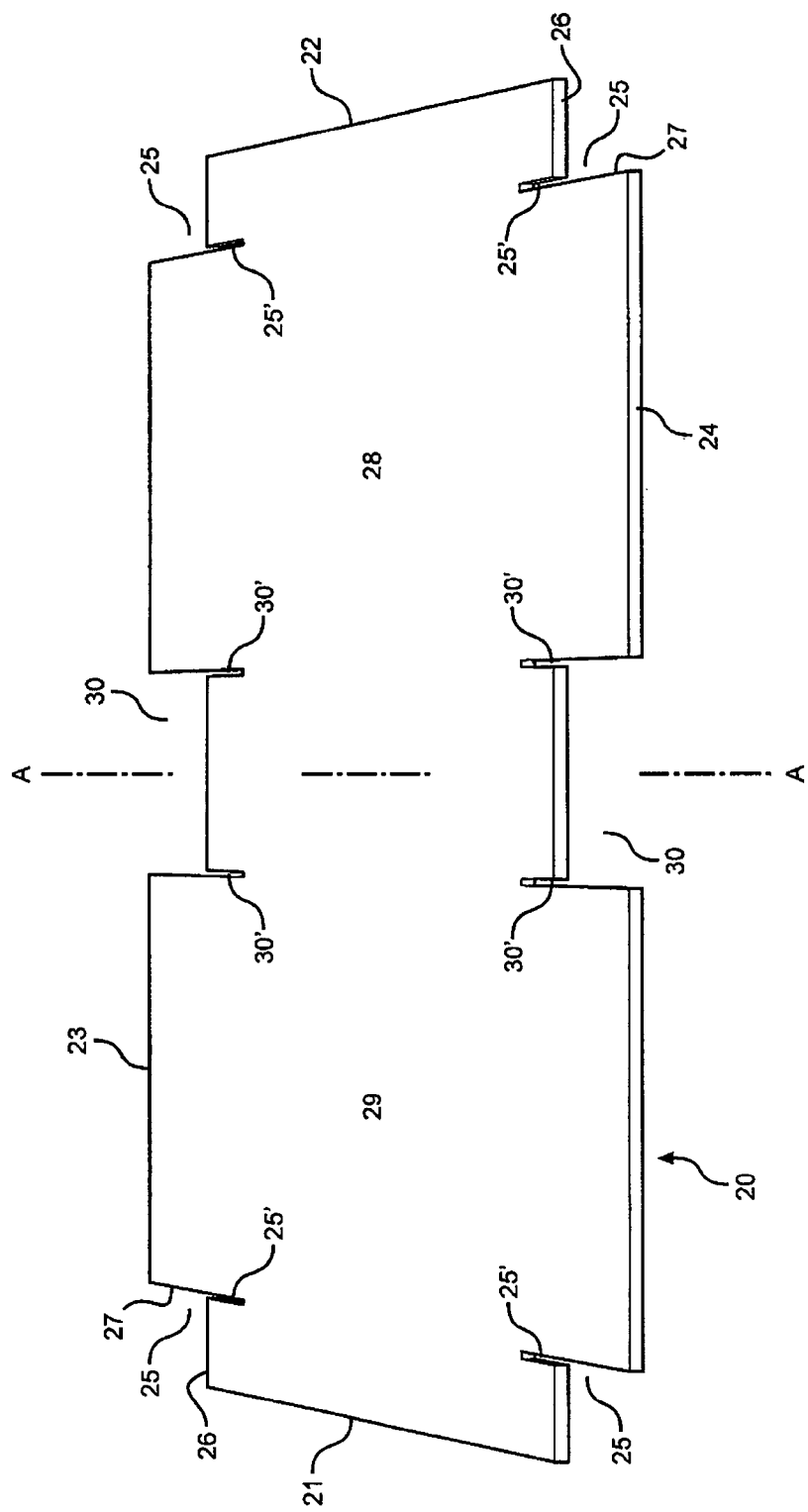
FIG. 4 is a top plan view of the intermediate foam layer showing cut outs with slits therein to facilitate the free standing nature of the insulated bag when is use.
Figure 5:
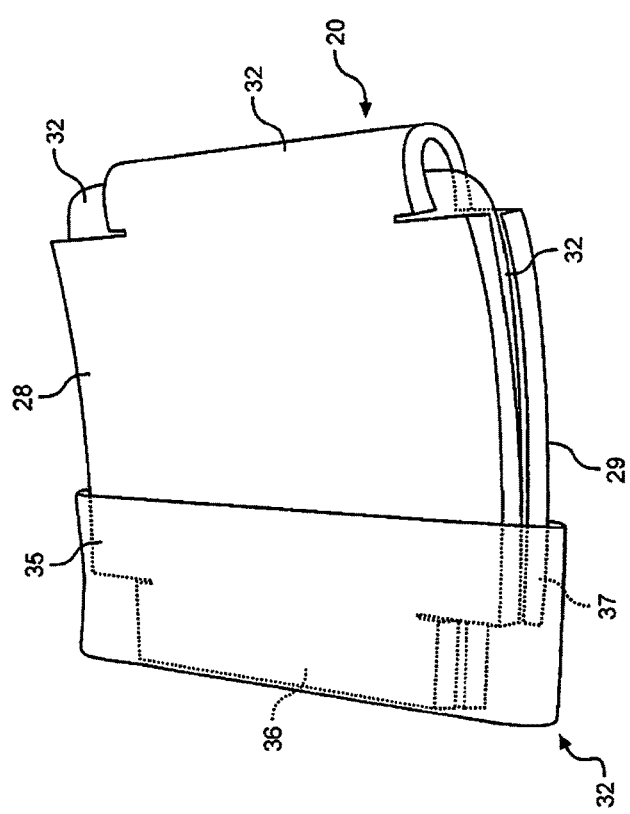
FIG. 5 is a perspective view of the inner plastic layer of FIG. 1 formed into a pouch-like structure and showing a cuff thereof frictionally engaging the upper ends of the intermediate foam insulating material therein.

With reference to FIG. 4, the foam insulating layer 20 may be between approximately one half inch to one and one half inches in thickness and may be of varying densities. The foam layer is form of a sheet that is generally rectangular in shape with two ends 21 and 22 being substantially parallel to each other and two long sides 23 and 24 being substantially parallel to each other. The insulating layer has, in each corner, generally rectangular cutout regions 25. Each cutout is defined by two intersecting wall portions 26 and 27 that intersect generally perpendicularly with one another. The cutout regions 25 may include an additional slit 25' extending into the width of the material to facilitate bending. The size of the cut outs 25 may vary depending upon the size of the insulated bag with the function of the cut outs to permit the top of the completed bag to fold at the corners thereof when the layer 20 is folded centrally thereof at A-A to create opposing side walls 28 and 29, see FIG. 5. In addition to the corner cut outs, opposing cut outs 30 are provided centrally of the sides of the intermediate foam layer. The cut outs 30 are rectilinear and their size may also vary, it being the function of these cut outs to facilitate the folding of the bottom 12 of a complete insulated bag to form a generally flat support base for the bag when an item is placed therein and the bag is placed on a support surface "S", as is shown in FIG. 3. As with the other cutout regions 25 the cutout regions 30 may include additional slits 30' extending into the width of the material to facilitate bending.

The insulated bag 10 also includes an innermost plastic layer 32 that is made of one or more materials known for lower thermal convection. Such materials include polyurethanes, polypropylenes, elastomeric compounds and like materials that are leak-proof, non-porous and food grade and that can be heat sealed or otherwise secured or welded to the outer reflective layer 11.

In the preferred embodiment of the invention shown in FIG. 1, the inner plastic layer 32 is formed as a bag or pouch that is only open at a top opening 34 thereof, as is shown in FIG. 2. The pouch is provided with an annular outwardly folded cuff 35 at the opening therein such that the cuff is of a size to frictionally receive and retain upper free end portions 36 and 37 of the opposing side walls 28 and 29 of the intermediate insulated foam. In this manner, the intermediate insulation material is mechanically secured to the inner plastic layer 32 such that both layers may be simultaneously inserted within the outer reflective or metallic foil layer. This frictional retention of the intermediate layer within the cuff of the inner plastic layer will also function to retain the intermediate insulating layer in place within the outer layer when the composite insulating bags of the invention are in use and will also substantially seal the inner volume 40 of the insulated bag 10 from the volume or area 38 between the inner layer 32 and the outer layer 11 to thereby prevent contamination of the inner volume 40. In some instances an adhesive or other agent may be used to completely or hermetically seal the upper portions 36 and 37 of the intermediate foam material within the cuff 35 of the inner layer 32.

In some embodiments and as shown in FIG. 2, the upper end of the inner plastic pouch layer 32 is welded at 41 to the inner surface 42 of the outer layer, at or spaced slightly below the upper edges of the outer layer to hermetically enclose the insulated bag 10 between the inner layer 32 and the outer layer 11.

Although not shown in the drawings, in some embodiments, the inner plastic pouch-like structures of the inner layers 32 may be heat sealed at their upper open ends 44 after articles or items are placed with the insulated bags 10. In other embodiments, mechanical zip-like closures or double sided tapes may be used to seal the upper ends 44 of the inner plastic bags after articles or items are placed therein. In yet other embodiments, the inner plastic bags may not be sealed at the opening 34.

Preferably, the upper ends of the outer reflective or foil bag-like layers 11 are provided with either heat seals or mechanical zip-like locks or friction lock seals. In some embodiments, the seals may be created using friction lock members 50 and 51 that are initially sealed at 52 to the upper edges of the opposing sides of the outer foil or reflective layers. Friction lock member 50 includes a handle 53 that is insertable through an opening 55 in the lock member 51. Lock member 51 is generally u-shaped in cross section, see FIG. 2, with a width of the cross section being such that lock member 50 is frictionally seated therein to seal the members together when the handle 53 is inserted through the opening 55 to thereby seal the bag 10, see FIG. 3.

The insulated bag 10 can be closed using other known conventional methods such as pressure closures, taping closures, flaps with re-sealable taping means, flaps with peel-off taping means, plastic zip-lock fasteners and the like.

Although not shown in the drawing figures, in some embodiments one or more addition foam layers may be inserted between the inner pouch or layer 32 and the outer layer 11 to increase the insulating properties of the insulated bags to increase the length of time products will remain at optimal temperatures.

Figure 8:
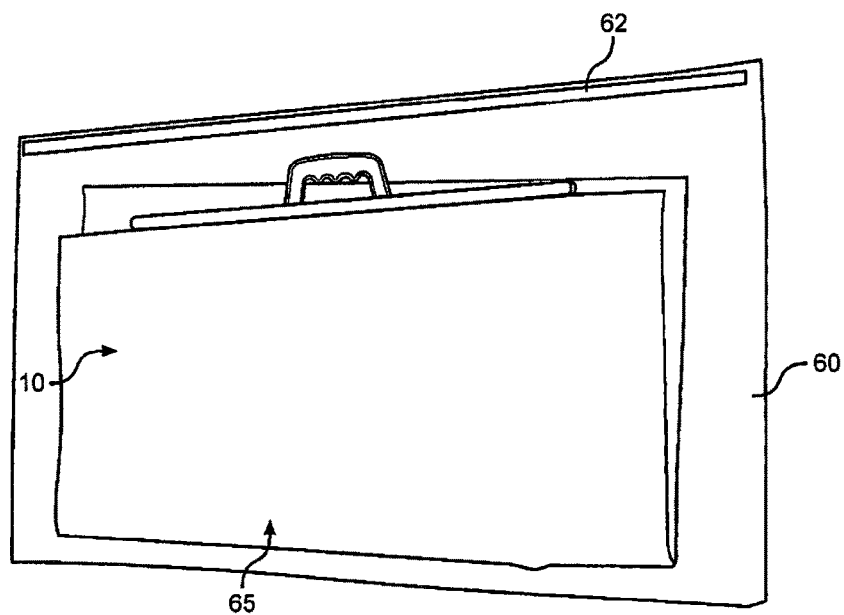
FIG. 8 is a perspective view of a plurality of insulated bags in accordance with the invention being placed within an outer plastic sealable enclosure for shipment to an end user while compactly retained or folded under internal reduced pressure.

As previously described, one of the advantages of the present invention is that the insulated bags may be compactly arranged and retained either for storage or shipment to wholesalers or end users to thereby reduce shipping package volumes and thus reducing costs associated with shipping and storage of the bags. With reference to FIG. 8, a first embodiment for reducing the volume of a package of the insulated bags 10 of the invention is shown in detail. As shown, one or more insulated bags 10 may be placed within an outer plastic bag 60 have one end with a sealable opening 62. Thereafter, the outer bag is mechanically collapsed, as reflected by the arrow 65, to force most air out of the enclosed insulated shipping bags 10 and the outer bag 60. Thereafter, the outer bag is sealed. In some embodiments, a partial vacuum may be applied within the outer bag to reduce the pressure therein and to reduce the volume of the overall package and the outer bag 60 subsequently sealed.

Figure 6:
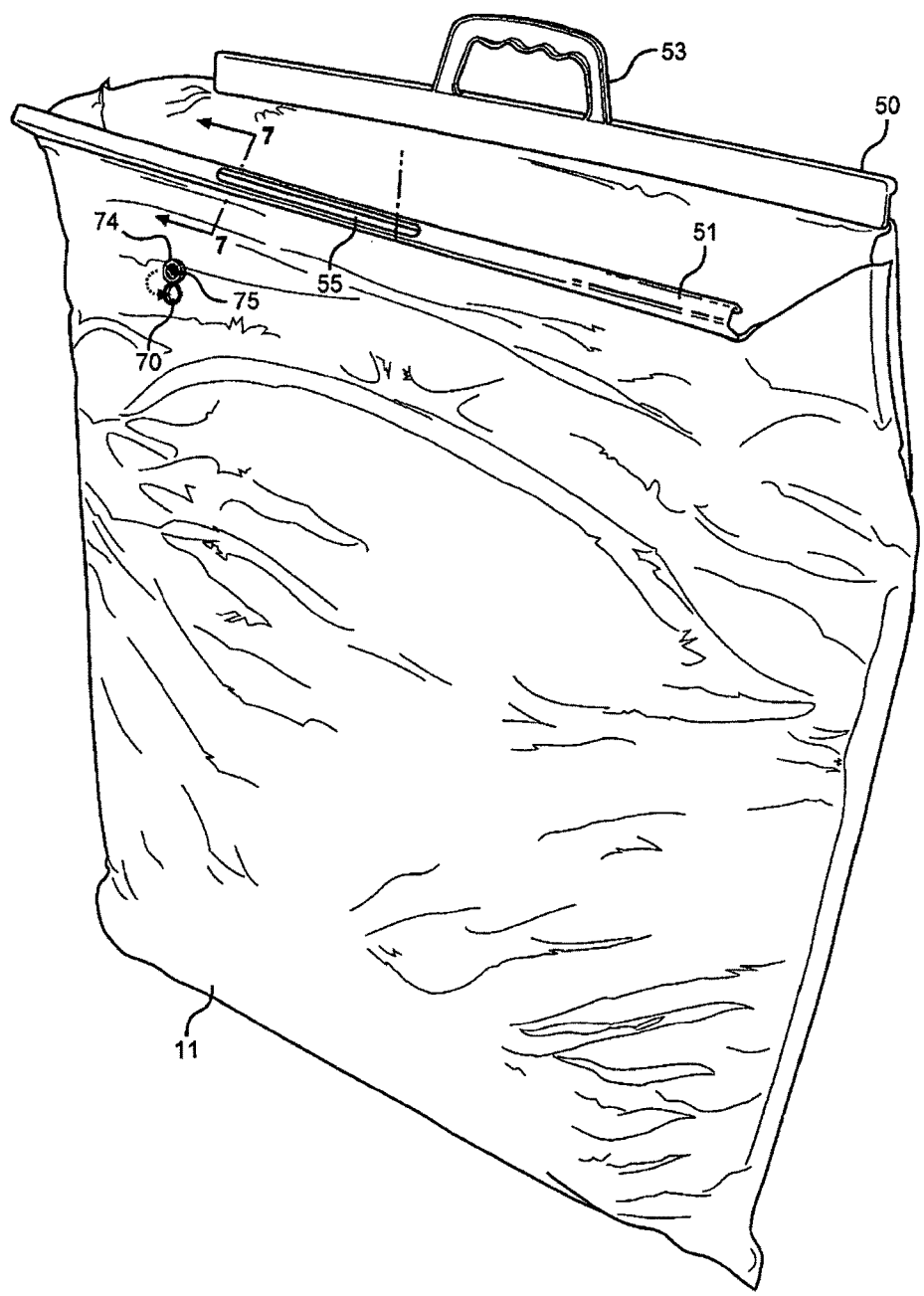
FIG. 6 is a view similar to FIG. 1 showing one of the insulated bags of the invention with an opening and related closure for use in evacuating and subsequently inflating the bag to permit compact storage and shipment to an end user.
Figure 7:
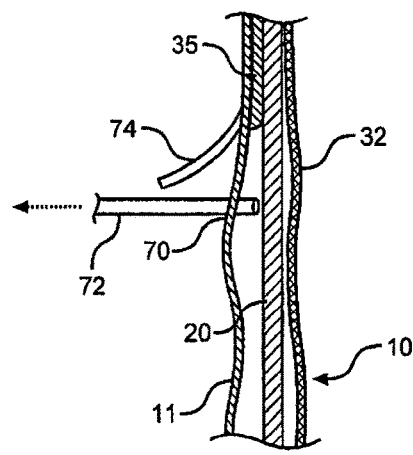
FIG. 7 is a cross section taken along line 7-7 of FIG. 6 showing a tube placed through the opening for reducing the pressure within bag and the open cell foam therein.

In another embodiment of the invention and with reference to FIGS. 6 and 7, to facilitate the compact handling and/or folding of the multi-layered insulated shipping and storage bags of the invention for storage or shipment to wholesalers or end users for subsequent use, the interior of the bags 10, and especially the intermediate open cell foam layers 20 are designed to be evacuated by the application of a partial vacuum. Such a vacuum may be applied to the bags through openings 70 between the outer reflective layer 11 and the intermediate open cell foam material 20 thereof by use of a vacuum tube 72 or by placing the bags 10 within an enclosure under a reduced atmosphere. When the vacuum tube is withdrawn, or the predetermined reduced pressure is obtained within the bags, the outer openings 70 therein are closed by removable adhesive patches or covers 74 to prevent ambient air from entering the bags. The covers or patches include a self stick adhesive 75 on the inner face thereof for use in sealing the openings to prevent inadvertent inflation of the spaces within the bags. When the bags have been at least partially evacuated so that air is removed from the open cell foam and from between the outer reflective layer and the inner plastic layer or pouch 32, they are easily stacked or folded into compact configurations for storage or for shipment. When the bags are to be used by an end user, the patches or covers are removed and the bags will automatically expand as ambient air enters the vacuum openings therein. After the bags are inflated, the adhesive patches or covers may be reapplied to prevent contaminants from entering the openings therein. In this regard, when the insulated shipping and storage bags 10 are to be used to ship or store items that must remain sterile, the vacuum processes and inflating processes may take place within sterile enclosures.

Figure 9:
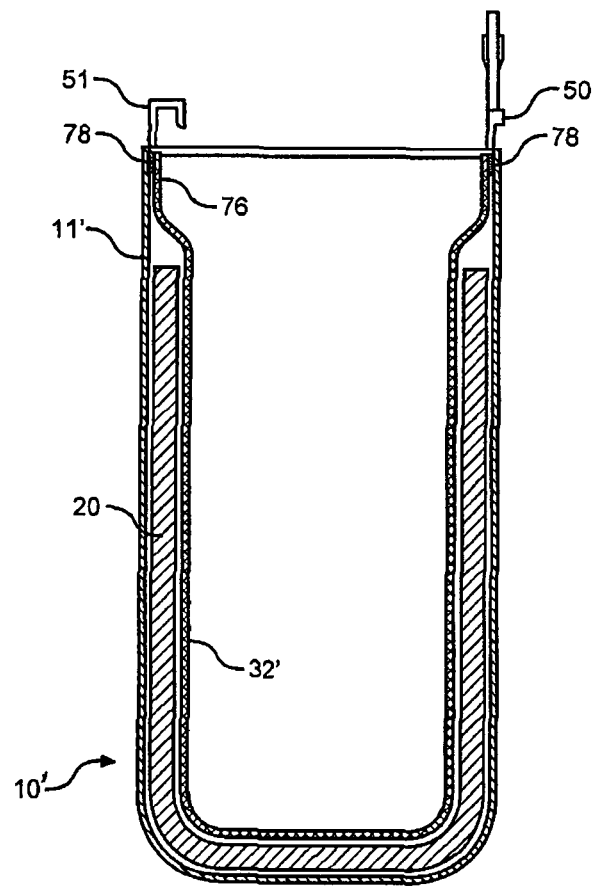
FIG. 9 is a cross sectional view similar to FIG. 2 showing an alternate embodiment of the invention.

With reference to FIG. 9, another embodiment or insulated bag 10' of the invention is disclosed wherein the cuff of the inner layer or pouch 32 associated with the embodiment shown in FIGS. 1 and 2 is not used. In this embodiment, the inner layer or pouch 32' includes an upper free edge 76 that is directly sealed or welded at 78 to the inner surface of the outer reflective layer 11' below the opening into the bag 10'. The bag of this embodiment may be used with the vacuum opening and seals associated therewith as previously described and the materials and the manner of compact shipment or storage including the use of an outer packaging container or pouch may also be the same.

We claim:

1. An insulated shipping and/or storage bag having a bottom, walls, and an opening generally opposite the bottom, the bag consisting of:
    an outer layer;
    an intermediate insulating layer, said intermediate insulating layer consisting of at least one sheet of insulating material having a generally rectangular shape with cut outs at each of four corners of said generally rectangular shape and opposing cut outs generally centrally along opposite side edges of said generally rectangular shape so as to form (i) a middle portion between (ii) two side portions, and (iii) end portions opposite said middle portion, said cut outs enabling a free standing configuration whereby said intermediate insulating layer is folded centrally thereof so that said middle portion becomes the bottom, said side portions become the walls, and said end portions extend along opposing edges of said opening of the bag;
    an inner plastic layer, said inner plastic layer being secured or welded to said outer layer of said bag with said end portions of said intermediate insulating layer extending along opposing edges of said opening; and
    a bag closure capable of at least partially closing said opening, said bag closure being selected from the group consisting of a mechanical zip-like closure, a double sided tape, a pressure closure, a taping closure, a flap with re-sealable taping means, and a flap with peel-off taping means.

2. The insulated shipping and/or storage bag of claim 1, wherein said intermediate insulating layer consists of two or more sheets of foam material.

3. The insulated shipping and/or storage bag of claim 1, wherein said outer layer consists of a generally rectangular shaped film that is folded over onto itself and welded along side edges so as to form (i) a bottom portion, (ii) opposite side edges, and (iii) an outer layer opening.

4. The insulated shipping and/or storage bag of claim 1, wherein an upper end portion of said outer layer extends beyond said opening so as to form a flap, and said bag closure is positioned along said flap and consists of a peel-off taping means for taping close said bag.

5. An insulated shipping and/or storage bag having a bottom, walls, and an opening generally opposite the bottom, the bag consisting of:
    an outer layer forming a first major outer bag surface and a second major outer bag surface opposite said first major outer bag surface;
    an inner plastic layer that is configured to form a first major inner bag surface and a second major inner bag surface opposite said first major inner bag surface, said first major inner bag surface and said second major inner bag surface forming an article receiving pouch, said inner plastic layer being secured or welded to said outer layer;
    an intermediate insulating layer positioned between said outer layer and said inner plastic layer, said intermediate insulating layer consisting of at least one sheet of insulating material having (a) a first insulating material end portion positioned along said opening and extending within a first space between (i) said first major outer bag surface and (ii) said first major inner bag surface and (b) a second insulating material end portion positioned along said opening and extending within a second space between (i) said second major outer bag surface and (ii) said second major inner bag surface, each of said first insulating material end portion and said second insulating material end portion consisting of rectilinear cut outs at opposite corners thereof along said opening; and a bag closure capable of at least partially closing said opening.

6. The insulated shipping and/or storage bag of claim 5, wherein said intermediate insulating layer further consists of opposing cut outs generally centrally along opposite side edges of said intermediate insulating layer so as to form a middle portion between two side portions, said opposing cut outs enabling a free standing configuration whereby said intermediate insulating layer is folded centrally thereof so that said middle portion becomes the bottom, and said side portions become the walls.

7. The insulated shipping and/or storage bag of claim 6, wherein said intermediate insulating layer consists of two or more sheets of foam material.

8. The insulated shipping and/or storage bag of claim 5, wherein an upper end portion of said outer layer extends beyond said opening so as to form a flap, and said bag closure is positioned along said flap and consists of a peel-off taping means for taping close said bag.

9. The insulated shipping and/or storage bag of claim 5, wherein said outer layer consists of a generally rectangular shaped film that is folded over onto itself and welded along side edges so as to form (i) a bottom portion, (ii) opposite side edges, and (iii) an outer layer opening.

10. The insulated shipping and/or storage bag of claim 5, wherein upper free edges of said inner plastic layer are each secured or welded to an inner surface of said outer layer.

11. The insulated shipping and/or storage bag of claim 10, wherein an upper end portion of said outer layer extends beyond said opening so as to form a flap, and said bag closure is positioned along said flap and consists of a peel-off taping means for taping close said bag.

12. The insulated shipping and/or storage bag of claim 11, wherein said intermediate insulating layer consists of a single sheet of foam material.

13. An insulated shipping and/or storage bag having a bottom, walls, and an opening generally opposite the bottom, the bag consisting of:
    an outer layer forming a first major outer bag surface and a second major outer bag surface opposite said first major outer bag surface;
    an inner plastic layer that is configured to form a first major inner bag surface and a second major inner bag surface opposite said first major inner bag surface, said first major inner bag surface and said second major inner bag surface forming an article receiving pouch, said inner plastic layer being secured or welded to said outer layer;
    an intermediate insulating layer positioned between said outer layer and said inner plastic layer, said intermediate insulating layer consisting of at least one sheet of insulating foam material having (a) a first insulating foam material end portion positioned along said opening and extending within a first space between (i) said first major outer bag surface and (ii) said first major inner bag surface, (b) a second insulating foam material end portion positioned along said opening and extending within a second space between (i) said second major outer bag surface and (ii) said second major inner bag surface, each of said first insulating foam material end portion and said second insulating foam material end portion consisting of rectilinear cut outs at opposite corners thereof along said opening, (c) a middle portion formed via opposing cut outs generally centrally along opposite side edges of said intermediate insulating layer, and (d) side portions extending between each rectilinear cut out and each opposing cut out, said opposing cut outs enabling a free standing configuration whereby said intermediate insulating layer is folded centrally thereof so that said middle portion becomes the bottom, and said side portions become the walls; and a bag closure capable of at least partially closing said opening, said bag closure being selected from the group consisting of a mechanical zip-like closure, a double sided tape, a pressure closure, a taping closure, a flap with re-sealable taping means, and a flap with peel-off taping means.

14. The insulated shipping and/or storage bag of claim 13, wherein said intermediate insulating layer consists of two or more sheets of foam material.

15. The insulated shipping and/or storage bag of claim 13, wherein said bag closure consists of a flap with peel-off taping means.

16. The insulated shipping and/or storage bag of claim 1, wherein said insulating material consists of foam material.

17. The insulated shipping and/or storage bag of claim 5, wherein said insulating material consists of foam material.

18. The insulated shipping and/or storage bag of claim 13, wherein said insulating material consists of open cell foam material.

19. The insulated shipping and/or storage bag of claim 1, wherein said insulating material further consists of (i) a first set of slits extending from said cut outs into a central portion of said insulating material and (ii) a second set of slits extending from said opposing cut outs into a central portion of said insulating material so as to facilitate bending of said insulating material.

20. The insulated shipping and/or storage bag of claim 6, wherein said insulating material further consists of (i) a first set of slits extending from said rectilinear cut outs into a central portion of said insulating material and (ii) a second set of slits extending from said opposing cut outs into a central portion of said insulating material so as to facilitate bending of said insulating material.

* * * * *